United States Patent Office 3,415,970
Patented Dec. 10, 1968

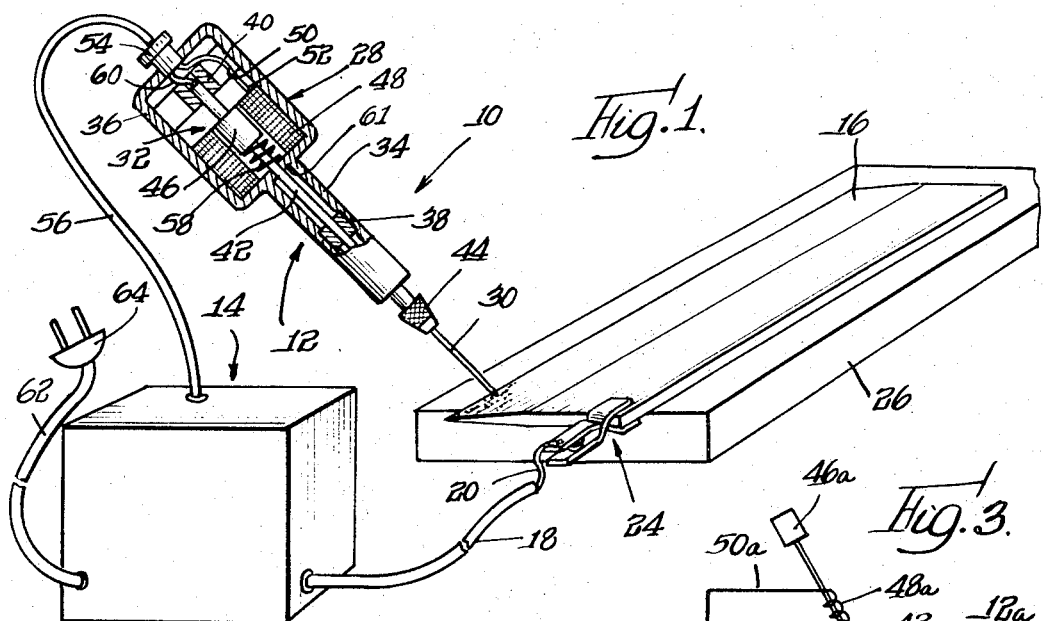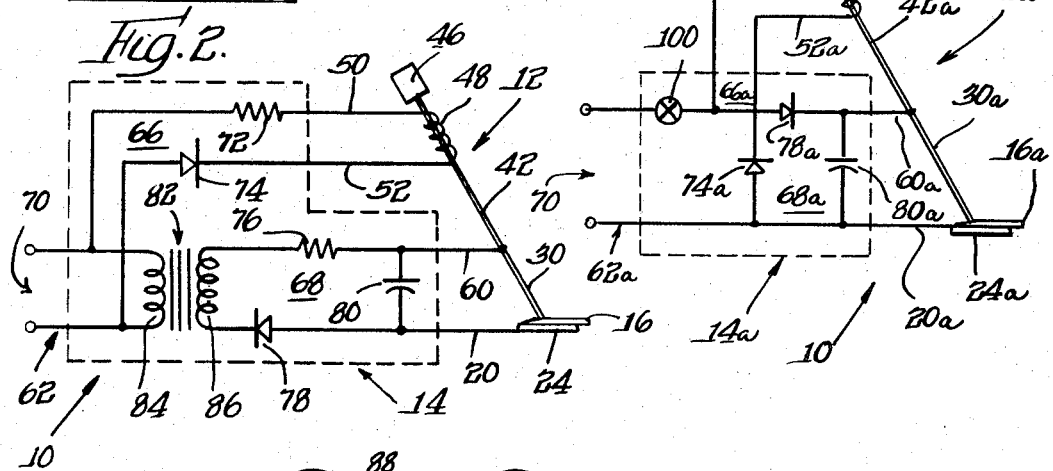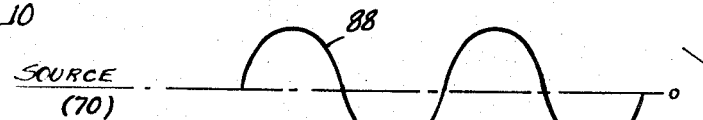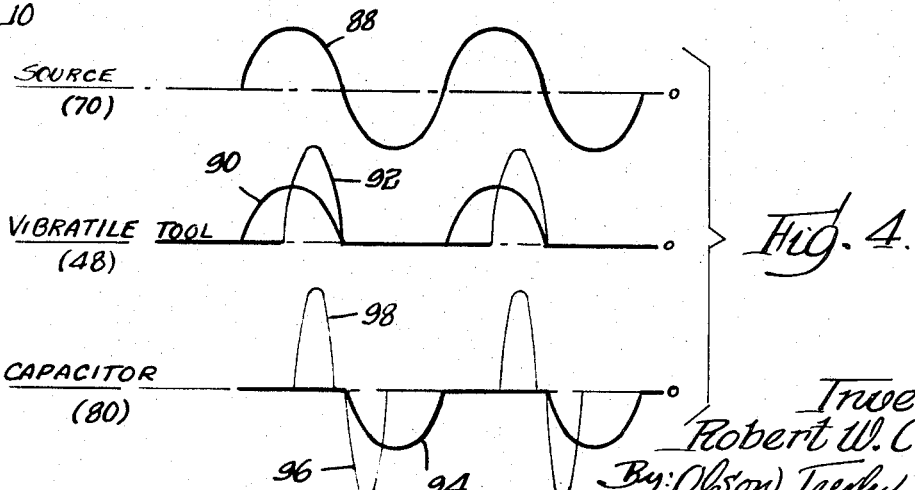

3,415,970
HAND-HELD DEVICE FOR METAL WORKING
USING A VIBRATING ELECTRODE
Robert W. Cline, New Paris, Ind., assignor to Goshen
Rubber Co., Inc., Goshen, Ind., a corporation of
Indiana
Filed June 23, 1965, Ser. No. 466,338
6 Claims. (Cl. 219—70)

ABSTRACT OF THE DISCLOSURE

Apparatus for either disintegrating or impregnating a metal surface by means of a pulsating electric arc including a vibratile tool comprising an electromagnetic arrangement and an electrode that is coupled to the electromagnetic arrangement for vibration. Electric circuit means are provided for energizing both the electrode and the electromagnetic arrangement; and this electric circuit includes a tap circuit that is connectable to a source of power, a first energizing circuit for the electromagnetic arrangement, and second energizing circuit for the electrode. Each of the energizing circuits is arranged to deliver pulsating direct current power, and the energizing circuits are arranged to carry such power in opposite phases. In addition, a current limiting arrangement is provided in the circuit to control the line current to the electrode.

This invention relates generally to the metal working arts and more particularly to hand-held devices incorporating a vibrating electrode and arranged either to disintegrate or to impregnate a metal surface by means of a pulsating electric arc.

In the past, hand tools incorporating a vibrating electrode have been operated from an electrical circuit which delivered power pulses to the vibratory mechanism and to the electrode in timed relationship. Depending upon the relative polarity of the electrode and the workpiece, either metal is removed from the workpiece by disintegration or the workpiece is impregnated with a substance such as tungsten carbide. The prior devices have proved to be expensive to produce primarily because of the costly arrangements employed in properly timing the energization of the vibratory mechanism and the electrode.

Therefore, an important object of the present invention is to provide apparatus of the type described which is characterized by its low cost of manufacture.

A more general object of the invention is to provide new and improved apparatus for working metal surfaces by means of a pulsating electric arc.

These and other objects and features of the invention will become more apparent from a consideration of the following descriptions.

The invention, both as to its construction and its mode of operation, will be better understood by reference to the following disclosure and drawing forming a part thereof, wherein:

FIG. 1 is a perspective view of apparatus constructed in compliance with the principles of the present invention, the vibratile tool being shown in partial section to reveal details of its construction;

FIG. 2 is a schematic diagram of the circuit employed in the apparatus of FIG. 1;

FIG. 3 is a schematic diagram of a modified form of the circuit for use in the apparatus of the invention; and FIG. 4 is a graphic representation of the current and voltage characteristics in various parts of the apparatus of the invention.

Referring now in detail to the drawing, specifically to FIG. 1, apparatus for working metal surfaces by means of a pulsating electric arc is indicated generally by the reference numeral 10. The apparatus 10 includes a vibratile tool unit 12 and an operating unit 14. The tool unit 12 is shown to be of the hand-held type, and the operating unit 14 is fabricated to be of portable construction. The apparatus 10 is intended for treating a metal workpiece such as a knife blade 16; and usefully, the operating unit 14 includes a ground cable 18 incorporating a conductor 20, conductor 20 being connected to an alligator clamp 24 that is employed in gripping and making electrical contact with the workpiece. When the workpiece is thus made the ground connection, the vibratile tool unit 12 is made the energized element whereby to deposit a substance such as tungsten carbide on the surface of the workpiece. However, it is recognized that by making the vibratile tool unit the grounded element and the workpiece the energized element, local disintegration of the workpiece can be achieved; and accordingly, such a rearrangement is intended to be part of the present invention. In the illustrated embodiment, the workpiece 16 is advantageously disposed on an insulated support 26.

The vibratile tool unit 12 comprises a housing 28, an electrode 30 and an electromagnetic arrangement 32. The housing 28 consists of a pencil portion 34 and an upper body portion 36, a sleeve bearing 38 being mounted in the pencil portion and a sleeve bearing 40 being mounted in the upper body portion slidably to receive a reciprocable rod 42. Outside the housing 28, the rod 42 carries an adjustable chuck 44 which releasably holds the electrode 30. Inside the housing 28, the rod 42 carries a magnetically attractable armature 46. The housing 28 also encloses an electric coil 48 which, in conjunction with the armature 46, comprises the electromagnetic arrangement 32. The coil 48 is energized by means of a pair of conductors 50 and 52 which exit from the housing 28 through a fitting 54 and which are combined in a cable 56 which leads to the operating unit. When energized, the coil 48 acts to draw the armature 46 into its tubular core whereby to urge the reciprocable rod 42 and the electrode 30 generally outwardly from the housing 28. A compression spring 58 is confined between the armature 46 and a transverse wall 61 that defines the floor of the upper body portion 36 of the housing, and this compression spring acts to return the rod 42 to a retracted condition upon de-energization of the coil 48. The fitting 54 and the sheath of cable 56 also carry a conductor 60 which makes electrical connection between the electrode 30 and the operating unit 14. Advantageously, the electrode 30 is fabricated of tungsten carbide in order that the operation of apparatus 10 may be used to deposit a multiplicity of filled craters of that material on the surface of knife blade 16. Conveniently, the operating unit 14 includes a tap circuit that is connectable to a source of alternating current power, the unit 14 specifically including an input cable 62 which terminates externally in a male plug 64 for this latter purpose.

Turning to FIG. 2 for a description of the operating unit, the unit 14 comprises electric circuits which include, in addition to the tap circuit of cable 62, energizing circuits 66 and 68. Circuits 66 and 68 are arranged to deliver pulsating direct current power to the coil 48 and to the electrode 30 respectively. In the illustrated embodiment, the tap circuit of cable 62 is connected to a source 70 of 115-volt, 60-cycle alternating current power; and the circuit 66 includes a resistor 72 which is joined in series circuit with the coil 48 and with half wave rectifying means, specifically a silicon rectifier 74, the circuit 66 being connected across the source 70 by the tap circuit of cable 62. On the other hand, the circuit 68 includes a resistor 76 which is joined in series circuit with the electrode 30, the workpiece comprising the knife 16, the clamp 24 and half wave rectifying means comprising a silicon rectifier 78. In compliance with an important feature of the invention, a capacitor 80 is connected in circuit 68 in parallel with the electrode 30.

In the embodiment of the operating circuit that is shown in FIG. 2, an isolating transformer 82 is connected between the tap circuit and the energizing circuit 68, transformer 82 acting to limit the line current to electrode 30 and cooperating to promote a desired phase relationship in the energy delivered to the electrode and to the coil 48, as will be described more fully hereinafter. Specifically, a primary coil 84 is connected across the source 70 by the tap circuit, coil 84 being inductively coupled to a secondary coil 86 that is joined in series circuit with resistor 76 and rectifier 78.

In specific embodiments of the energizing circuits 66 and 68, resistor 72 was made to have a value of 300 ohms, rectifier 74 was selected to have a rating of 150 milliamperes, resistor 76 was made to have a value of 10 ohms, and rectifier 78 was selected to be rated at 300 milliamperes. Correspondingly, transformer 82 was selected to be rated at 150 volt-amperes, and the capacitor 80 had a value of 10 microfarads.

As suggested hereinabove, the coil 48 and the electrode 30 are intended to be energized by power from the opposite half waves of the alternating line voltage of source 70. For this purpose, the coils 84 and 86 are arranged to be in phase, and the rectifiers 74 and 78 are connected in circuit to be conductive for the opposite half cycles of the source voltage alternations. Thus, pulsating direct current power of a first phase is delivered to the coil 48 and pulsating current power of a second phase is delivered to the electrode 30. This relationship is illustrated schematically in FIG. 4 where the top graph shows the voltage characteristic of the source 70 by the sinusoidal line 88. In the middle graph of FIG. 4, the power at coil 48 is illustrated to include the voltage characteristic at line 90 as being half wave rectified, the corresponding half wave rectified current characteristic being illustrated at line 92 as lagging slightly the voltage characteristic. Correspondingly, the power delivered to the capacitor 80 is shown in the lower graph of FIG. 4 where the voltage characteristic is illustrated at line 94 as being half wave rectified and of opposite phase to that delivered to the coil 48. The related current characteristic for charging of the capacitor is shown at line 96 as being of opposite phase to that at coil 48, whereas the current characteristic for discharge of the capacitor is shown at line 98.

Comparing the middle and lower graphs of FIG. 4, it will be apparent that the maximum current to the electrode 30 which is developed by discharge of the capacitor 80 occurs on the decay of the voltage at coil 48 and therefore at a time when the coil 48 is operated to extend the electrode in its approach toward the workpiece. This action develops an intense arc between the tip of the electrode and the workpiece. Similarly, when the voltage to the coil 48 is at its maximum value whereby to provide maximum extension of the electrode from the tool housing 28, the current discharge from the capacitor 80 through the electrode is substantially terminated and no further charging will take place for another half cycle of operation. Thus, welding of the tip of the electrode to the workpiece is prevented.

The presence of transformer 82 in energizing circuit 68 has been found to be particularly advantageous in that the high reactance of the transformer secondary coil 86 event that the electrode is inadvertantly mainained in conacts to limit the current flow to the electrode 30 in the event that the electrode is inadvertantly maintained in contact with the workpiece during a charging portion of the cycle. As will be recognized, the half wave rectification achieved by rectifier 74 develops a 60-cycle reciprocal vibration of the rod 42 and the electrode 30 connected thereto when a 60-cycle power source is utilized.

Other specific facets of the operation of apparatus 10 will be apparent from the foregoing descriptions.

While a particular embodiment of the invention has been thus far shown and described, it should be understood, of course, that the invention is not limited thereto since many modifications may be made. Therefore and in order to enhance the understanding of the invention, a modified embodiment thereof, modified particularly in the arrangement of the operating unit, is shown in FIG. 3. Since the embodiment of FIG. 3 incorporates many elements which are similar to those found in the embodiment of FIG. 2, like numerals have been used to designate like parts with the suffix letter $a$ being employed to distinguish those elements associated with the embodiment of FIG. 3.

The operating unit 14a which is shown in FIG. 3 is particularly characterized by the elimination of resistors from the circuit and by the replacement of the transformer as a current limiting device by an incandescent lamp 100. Lamp 100 is specifically connected between one leg of the tap circuit of cable 62a and the connections of that leg with circuits 66a and 68a. Lamp 100 is of conventional arrangement wherein its electrical resistance increases as the applied current increases. Thus, the lamp acts as a current limiting device for controlling the current flow through the circuits 66a and 68a. In one specific embodiment of the circuit of FIG. 3, the lamp 100 has been selected to a 100-watt tungsten filament lamp.

The circuit arrangement of FIG. 3, as compared with the circuit arrangement of FIG. 2, is considerably less expensive and more suited to permanent installation. In such latter instance, conductor 62a may be solidly connected to the grounded side of the supply line to insure operator safety. On the other hand, the circuit of FIG. 2, when compared with the circuit of FIG. 3, can be made safe by selecting the transformer 82 to limit the voltage displayed at the electrode 30.

It will be apparent from the foregoing descriptions that the disclosed apparatus, particularly in the arrangement of the operating unit thereof, is of especially economical construction. For example, no expensive rotary switches or the like are employed in controlling the operation of the vibratile tool unit.

Therefore, the specific example herein shown and described is to be considered as being primarily illustrative. Various changes beyond those described will, no doubt, occur to those skilled in the art; and such changes are to be understood as forming a part of this invention insofar as they fall within the spirit and scope of the appended claims.

The invention is claimed as follows:

1. In apparatus for working metal surfaces by means of a pulsating electric arc, the combination comprising: vibratile tool means, including electromagnetic means and electrode means coupled to said electromagnetic means for vibration; and electric circuit means, including tap circuit means connectable to a source of alternating current power, a first circuit connecting said electromagnetic means to said tap circuit means and comprising half wave rectifying means connected to utilize a first half of the input waveform and arranged to deliver pulsating direct current power to said electromagnetic means, and a second circuit connecting said electrode to said tap circuit means and comprising capacitor means for delivering pulses of electrical energy to said electrode, half wave rectifying means connected to utilize the second half of the input waveform and arranged to deliver pulsating direct current power to said electrode, and current limiting means connected between said tap circuit means and said second circuit to limit the line current to said electrode.

2. In apparatus for working metal surfaces by means of a pulsating electric arc, the combination comprising: vibratile tool means, including electromagnetic means and electrode means coupled to said electromagnetic means for reciprocal vibration; and electric circuit means, including tap circuit means connectable to a source of alternating current power, a first circuit connecting said electromagnetic means to said tap circuit means and comprising half wave rectifying means arranged to deliver pulsating direct current power of a first phase to said electromagnetic means, and a second circuit connecting said electrode to said tap circuit means and comprising capacitor means for delivering pulses of electrical energy to said electrode, half wave rectifying means arranged to deliver pulsating direct current of a second phase to said capacitor means, and current limiting means connected between said tap circuit means and said second circuit to limit the line current to said electrode.

3. In apparatus for working metal surfaces by means of a pulsating electric arc, the combination comprising: vibratile tool means, including electromagnetic means and electrode means coupled to said electromagnetic means for vibration; and electric circuit means, including tap circuit means connectable to a source of alternating current power, a first circuit connecting said electromagnetic means to said tap circuit means and comprising half wave rectifying means arranged to deliver pulsating direct current power of a first phase to said electromagnetic means, and a second circuit connecting said electrode to said tap circuit means and comprising capacitor means for delivering pulses of electrical energy to said electrode, half wave rectifying means arranged to deliver pulsating direct current power of a second phase to said capacitor means, and isolating transformer means connected between said tap circuit means and said second circuit to limit the line current to said electrode and to cooperate in promoting the opposite phase relationship of the energy delivered to said capacitor means and to said electromagnetic means.

4. In apparatus for working metal surfaces by means of a pulsating electric arc, the combination comprising: vibratile tool means, including electromagnetic means and electrode means coupled to said electromagnetic means for vibration; and electric circuit means, including tap circuit means connectable to a source of alternating current power, a first circuit connecting said electromagnetic means to said tap circuit means and comprising half wave rectifying means connected to utilize a first half of the input waveform and arranged to deliver pulsating direct current power to said electromagnetic means, and a second circuit connecting said electrode to said tap circuit means and comprising capacitor means for delivering pulses of electrical energy to said electrode, half wave rectifying means connected to utilize the second half of the input waveform and arranged to deliver pulsating direct power to said capacitor means, and lamp means connected between said tap circuit means and said second circuit to limit the line current to said electrode.

5. In apparatus for working metal surfaces by means of a pulsating electric arc, the combination comprising: vibratile tool means, including electromagnetic means and electrode means coupled to said electromagnetic means for reciprocal vibration, said electrode means including an element of metal carbide; and electric circuit circuit means, including tap circuit means connectable to a source of alternating current power, a first circuit connecting said electromagnetic means to said tap circuit means and comprising half wave rectifying means arranged to deliver pulsating direct current power of a first phase to said electromagnetic means, and a second circuit connecting said electrode to said tap circuit means and comprising capacitor means for delivering pulses of electrical energy to said electrode, half wave rectifying means arranged to deliver pulsating direct current power of a second phase to said capacitor means, and current limiting means connected between said tap circuit means and said second circuit to limit the line current to said electrode.

6. In apparatus for working metal surfaces by means of a pulsating electric arc, the combination comprising: vibratile tool means, including electromagnetic means and electrode means coupled to said electromagnetic means for vibration; and electric circuit means, including tap circuit means connectable to a source of power, a first circuit connecting said electromagnetic means to said tap circuit means and comprising means arranged to deliver pulsating direct current power of a first phase to said electromagnetic means, and a second circuit connecting said electrode to said tap circuit means and comprising capacitor means for delivering pulses of electrical energy of a second, substantially opposite phase to said electrode.

References Cited

UNITED STATES PATENTS

| 2,308,860 | 1/1943 | Clark | 219—69 X |
| 2,399,212 | 4/1946 | Dawson et al. | 219—69 |
| 3,200,234 | 8/1965 | Crawford | 219—76 |
| 3,277,266 | 10/1966 | Blaszkowski | 219—76 |

RICHARD M. WOOD, *Primary Examiner.*

R. F. STAUBLY, *Assistant Examiner.*

U.S. Cl. X.R.

219—76, 240, 384